United States Patent
Chazot et al.

(10) Patent No.: US 10,789,181 B2
(45) Date of Patent: Sep. 29, 2020

(54) WIRELESS COMMUNICATION PROTOCOL HAVING A PREDETERMINED REPORT RATE

(71) Applicant: Logitech Europe S.A., Lausanne (CH)

(72) Inventors: Philippe Chazot, Saint-Jorioz (FR); Jiri Holzbecher, Lausanne (CH); Frédéric Fortin, Annemasse (FR); Fabrice Sauterel, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/420,003

(22) Filed: May 22, 2019

(65) Prior Publication Data

US 2020/0133891 A1     Apr. 30, 2020

Related U.S. Application Data

(60) Provisional application No. 62/751,705, filed on Oct. 28, 2018.

(51) Int. Cl.
  *G06F 13/10* (2006.01)
  *H04B 1/38* (2015.01)
  *H04L 12/26* (2006.01)

(52) U.S. Cl.
  CPC ............. *G06F 13/102* (2013.01); *H04B 1/38* (2013.01); *H04L 43/16* (2013.01)

(58) Field of Classification Search
  None
  See application file for complete search history.

(56) References Cited

U.S. PATENT DOCUMENTS

| | | | |
|---|---|---|---|
| 8,571,005 B1 * | 10/2013 | Vleugels | G06F 5/16 370/350 |
| 2004/0059807 A1 * | 3/2004 | Klotz | H04L 41/0631 709/223 |
| 2006/0215601 A1 * | 9/2006 | Vleugels | H04W 28/26 370/328 |
| 2014/0075069 A1 | 3/2014 | Mullins et al. | |

(Continued)

OTHER PUBLICATIONS

Non-Final Office Action for U.S. Appl. No. 16/369,992 dated May 13, 2020, 10 pages.

*Primary Examiner* — Michael Sun
(74) *Attorney, Agent, or Firm* — Kilpatrick Townsend & Stockton LLP

(57) ABSTRACT

In some embodiments a transceiver is configured to wirelessly transfer data between a host computing device and one or more peripheral devices over a communication path using a communication data construct comprising a packet structure arranged in a repetitive communication structure. The repetitive communication structure can include a transmit time window within which the host transmits data to the one or more connected peripheral devices and a receive time window within which the host receives data from the one or more connected peripheral devices. A duration of the receive time window is set based on a predetermined communication report rate between the host computing device and the one or more connected peripheral devices. A new peripheral device is added as a connected peripheral device when the new peripheral device transmits a request to the host to be added as a connected peripheral device and the receive time window has time available to add the new peripheral device.

20 Claims, 7 Drawing Sheets

(56) References Cited

U.S. PATENT DOCUMENTS

| | | |
|---|---|---|
| 2016/0127516 A1 | 5/2016 | Chazot et al. |
| 2016/0142868 A1* | 5/2016 | Kulkarni .................. H01Q 1/24 455/456.5 |
| 2019/0159147 A1* | 5/2019 | Ryu ...................... H04W 24/08 |

* cited by examiner

WIRELESS COMMUNICATION PROTOCOL HAVING A PREDETERMINED REPORT RATE

CROSS-REFERENCES TO RELATED APPLICATIONS

This application claims the benefit and priority of U.S. Provisional Application No. 62/751,705, filed on Oct. 28, 2018, and titled "WIRELESS COMMUNICATION PROTOCOL WITH PERIPHERAL DEVICES", which is hereby incorporated by reference in its entirety for all purposes. This application is related to co-pending and co-owned U.S. Non-provisional application Ser. No. 16/369,992 filed on Mar. 29, 2019 titled "WIRELESS COMMUNICATION PROTOCOL WITH PERIPHERAL DEVICES", which is hereby incorporated by reference in its entirety for all purposes.

FIELD

The described embodiments relate generally to host devices that are configured to communicate with one or more peripheral electronic devices via a wireless communications interface. More particularly, the present embodiments relate to a communication method and protocol having high report rate characteristics and that enable a host computer to communicate with one or more peripheral electronic devices via a transceiver. Other embodiments enable a previously paired peripheral device to connect with a host by synchronizing with an existing communication dialog between the host and other peripheral devices.

BACKGROUND

Currently there are a wide variety of peripheral electronic devices that are configured to communicate with a host device including mice, keyboards, headsets, trackballs and the like. Many of these peripheral devices employ wireless communications protocols to provide the user with flexibility and convenience, however traditional wireless communications protocols can experience a relatively significant time delay between when a user interacts with a peripheral device and when the host recognizes the interaction (also referred to as "latency" herein), especially when multiple peripheral devices are used. In some applications, such as for example competitive gaming, peripheral devices and associated communication protocols having reduced latency are required.

BRIEF SUMMARY

In some embodiments a transceiver is configured to wirelessly transfer data between a host computing device and one or more connected peripheral devices using a communication data construct transmitted and received by the transceiver. The data construct comprises a packet structure forming a communication protocol for transferring peripheral device data between the host device and the one or more connected peripheral devices, wherein the packet structure is arranged in a repetitive communication cycle that includes a transmit time window within which the host transmits data to the one or more connected peripheral devices, and a receive time window within which the host receives data from the one or more connected peripheral devices. A duration of the receive time window is set based on a predetermined report rate between the host and the one or more connected peripheral devices. A logic circuit within the host adds a new peripheral device as a connected peripheral device when the new peripheral device transmits a request to the host to be added as a connected peripheral device and the receive time window has time available to add the new peripheral device.

In some embodiments the predetermined report rate is the number of times a communication cycle is performed each second, where the communication cycle includes: (1) a duration of the transmit time window, (2) a duration of the receive time window and (3) all overhead time for the transceiver to transmit to the one or more connected peripheral devices and to receive from the one or more connected peripheral devices.

In some embodiments the logic circuit selectively discontinues communicating with one of the one or more connected peripheral devices when the receive time window does not have time available to add the new peripheral device. In various embodiments subsequent to discontinuing communicating with the one of the one or more connected peripheral devices the logic circuit adds the new peripheral device as a connected device. In some embodiments the host prompts a user to accept discontinuing communicating with the one of the one or more connected peripheral devices before discontinuing communicating with the one of the one or more connected peripheral devices.

In some embodiments the logic circuit increases a duration of the receive time window when the receive time window does not have time available to add the new peripheral device, and subsequently adds the new peripheral device as a connected device. In various embodiments the host prompts a user to accept a reduced report rate before the logic circuit increases the duration of the receive time window. In some embodiments the logic circuit rejects adding the new peripheral device as a connected peripheral device when the new peripheral device transmits a request to the host to be added as a connected peripheral device and the receive time window does not have time available to add the new peripheral device.

In some embodiments a method for wirelessly transferring data between a host computing device and one or more connected peripheral devices comprises transferring the data with a data construct comprising a packet structure arranged in a repetitive communication cycle. The communication cycle includes a transmit time window within which the host transmits data to the one or more connected peripheral devices and a receive time window within which the host receives data from the one or more connected peripheral devices, wherein a duration of the receive time window is set based on a predetermined communication report rate between the host computing device and the one or more connected peripheral devices. A new peripheral device is added as a connected peripheral device when the new peripheral device transmits a request to the host to be added as a connected peripheral device and the receive time window has time available to add the new peripheral device.

In some embodiments the predetermined communication report rate is the number of communication cycles completed each second with each communication cycle including: (1) a duration of the transmit time window, (2) a duration of the receive time window and (3) all overhead time for the host to transmit to the one or more connected peripheral devices and to receive from the one or more connected peripheral devices. In various embodiments the method further comprises selectively discontinuing communications with one of the one or more connected peripheral devices when the new peripheral device transmits a request to the host to be added as a connected peripheral device and the receive time window does not have time available to add the new peripheral device.

In some embodiments subsequent to discontinuing communications with the one of the one or more connected peripheral devices the new peripheral device is added as a connected device. In various embodiments the host prompts a user to accept discontinuing communications with the one of the one or more connected peripheral devices before discontinuing communications with the one of the one or more connected peripheral devices. In some embodiments a duration of the receive time window is increased when the new peripheral device transmits a request to the host to be added as a connected peripheral device and the receive time window does not have time available to add the new peripheral device.

In some embodiments the host prompts a user to accept a reduced communication report rate before the duration of the receive time window is increased. In some embodiments the request of the new peripheral device to be added as a connected peripheral device is rejected when the new peripheral device transmits a request to the host to be added as a connected peripheral device and the receive time window does not have time available to add the new peripheral device.

In some embodiments a method for wirelessly transferring data between a transceiver of a host device and a peripheral device over a communications path comprises wirelessly transmitting from the peripheral device to the transceiver of the host device, a request to connect with the host computing device. A receiver circuit is configured in the peripheral device to receive data wirelessly transmitted from the transceiver of the host to a connected peripheral device when the request to connect with the host computing device is not accepted. Data wirelessly transmitted from the transceiver of the host to the connected peripheral device is received using the receiver circuit in the peripheral device. The data is analyzed with a processor of the peripheral device and an available transmit period is identified that can be used to transmit data from the peripheral device to the transceiver of the host device. Peripheral device data is transmitted to the transceiver of the host device during the available transmit period.

In some embodiments the request to connect with the host computing device is transmitted on a control channel and the data transmitted to the transceiver of the host device is transmitted on a separate piconet channel. In various embodiments after the transmitting peripheral device data to the transceiver, the host device and the peripheral device are connected on the piconet channel. In some embodiments the method further comprises using settings received from the host device during a previous pairing communications for the configuring the receiver circuit in the peripheral device.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

DETAILED DESCRIPTION

Aspects of the present disclosure relate generally to electronic communication in a computing environment, and more particularly to wireless communication protocols configured for adding new peripheral devices to a high report rate network that includes a host computing device coupled to a plurality of peripheral devices, according to certain embodiments.

In the following description, various examples of communication protocols and corresponding methods for host and peripheral device interaction are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
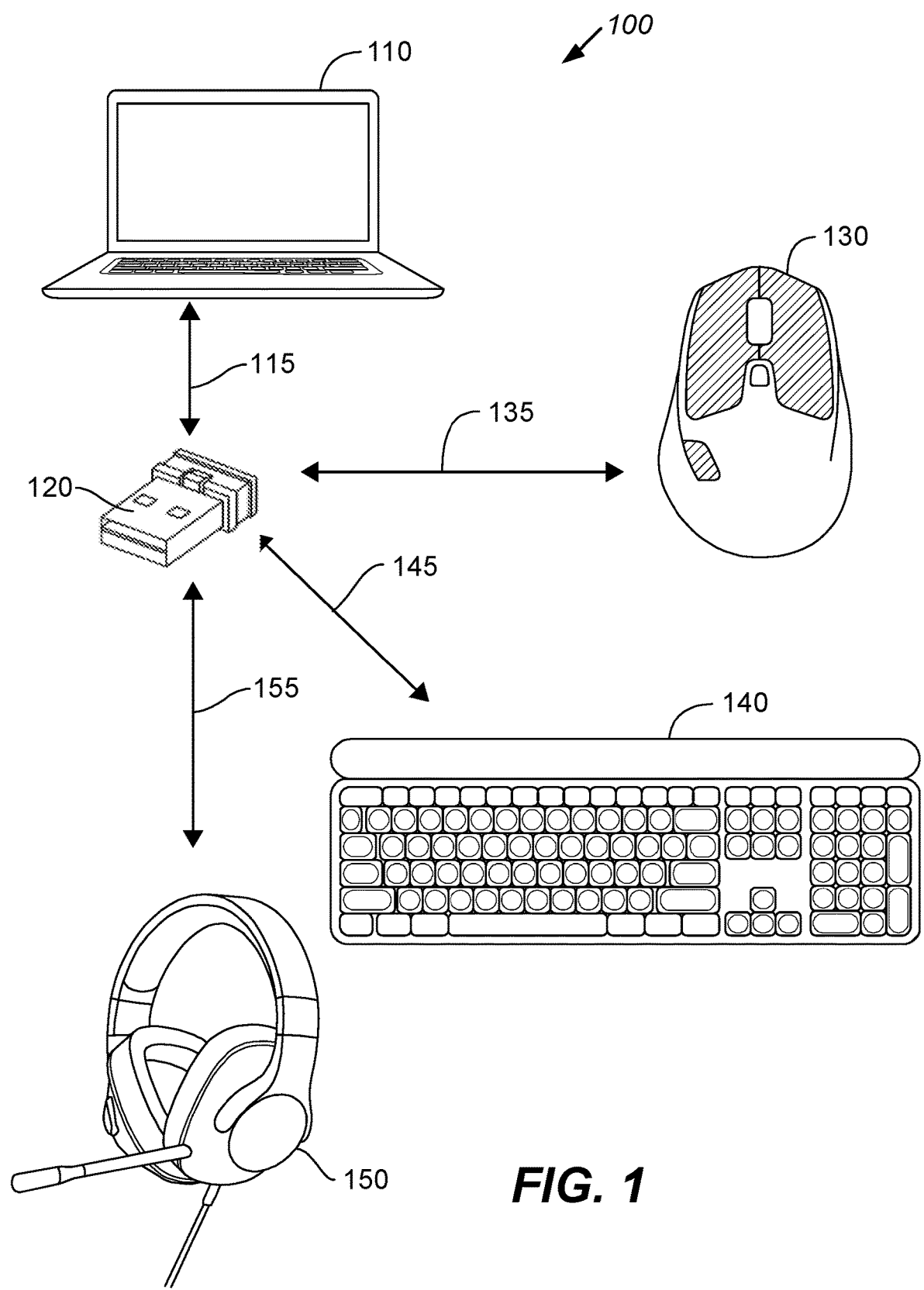
FIG. 1 shows a host computing device coupled to a plurality of peripheral computer devices via a wireless transceiver, according to certain embodiments.

The following high level summary is intended to provide a basic understanding of some of the novel innovations depicted in the figures and presented in the corresponding descriptions provided below. Aspects of the invention relate to various novel methods to add new peripheral devices to high report rate networks that can be well-suited for modern computing systems that run software with demanding operating requirements, such as competitive gaming systems. Over the last few decades, the advent of wireless communication protocols like Bluetooth® and BLE® has spurred innovation in connectivity between host computing devices and computer peripheral devices such that most peripheral devices have migrated from hard-wired connections to the host to wireless connections to the host. In many systems, the wireless communication protocols associated with wireless connections may be implemented over a Universal Serial Bus (USB) connected network, which may include multiple peripheral devices all communicating through a wireless USB hub (e.g., dongle) to a host computer device, as would be appreciated by one of ordinary skill in the art with the benefit of this disclosure (e.g., as shown in FIG. 1).

Although wireless connections offer improved flexibility and convenience for the user, some video game applications require relatively fast player response times and conventional wireless communication protocols (e.g., BLE) often do not provide acceptable performance metrics (e.g., computer mouse report latency and report rate, keystroke report latency and report rate) for the more discerning of gamers in the higher echelons of competitive e-sports.

For example, the delay from the time a user interacts with a mouse to the time the host registers the interaction "latency" is often used as a performance benchmark. A related common performance benchmark is the rate at which the device reports to the host (i.e., "report rate"), which is often desired to be at 1000 reports or more per second. While a relatively high report rate may be achievable when a single mouse is coupled to a wireless USB hub, when new peripherals are added to a common wireless USB hub, such as a keyboard, audio headset, and/or other peripheral devices (e.g., printer, microphone, presenter device, etc.), the report rate can be decreased with each additional device and may extend beyond a user's desired benchmark. More specifically, as more devices are added the host may need to reduce the report rate to all previously connected devices to make room in the communications cycle for the added device, so for example, the report rate for each peripheral device may be reduced from 1000 reports per second to 800 reports per second.

Within this disclosure a data construct and associated methods therefore are disclosed that enables a user or a system to set a fixed predetermined report rate for peripheral devices. More specifically, in some embodiments the system will use the fixed predetermined report rate to define transmit and receive windows for one or more peripheral devices that can be accommodated within the fixed predetermined report rate. When new peripheral devices are added, the method determines if time is available within the transmit and receive windows. If time is available for adding a specific peripheral device the device is added to the wireless network, that is sometimes called a "Piconet". However, if time is not available the host can give the user the option to either drop an existing peripheral device to make room for the new device or to decreased the fixed and predetermined report rate to make room in the transmit and receive windows for the new device.

In another embodiment a method is described for connecting a peripheral device to a network when the device has been previously paired, but is currently not connected to the network. The peripheral device can use a control channel that is different than the piconet channel to send a connection request to the host. If the host does not recognize or accept the request the peripheral device can turn on a receiver using settings supplied by the host during the previous pairing process. The peripheral device can then receive data from the host when the host transmits communications to other connected peripheral devices and determine if a time within the transceiver's receive window is available for the new peripheral to transmit data to the host. These embodiments and more are further discussed below in more detail.

FIG. 1 shows a system 100 including host computing device 110 that can be coupled to a plurality of peripheral computer devices 130-150 via a wireless transceiver 120, according to certain embodiments. Host computer 110 may include any suitable computing device, such as a desktop computer, laptop computer, tablet computer, wearable computing device (e.g., head-mounted display, smart watch, etc.), entertainment/infotainment system, vehicle computing systems, or other suitable computing device. Although one host computing device is shown, one of skill in the art will appreciate that multiple computing devices may be used in the embodiments that follow. For example, each peripheral device 130, 140, 150 may be coupled to multiple host computing devices (e.g., but one at a time). Transceiver 120 can be coupled to host computer via a wired or hardwired connection.

In one embodiment transceiver 120 may be a USB transceiver (also referred to as a "dongle" herein) that is socketed in and coupled to host computer 110. In some embodiments transceiver 120 may be wirelessly coupled to host computer 110 using a Bluetooth®, BLE® or other wireless protocol. In some embodiments each peripheral device 130, 140, 150 may be required to go through an initial "pairing" process with transceiver 120 where they exchange data that can include sharing their addresses, names, and profiles which can be stored in memory. The devices can also share a common secret key, which allows them to "connect" whenever they're within communications range in the future. When a peripheral device is connected to the transceiver, bidirectional communications between the devices can proceed using a data construct as described in more detail below.

In some embodiments transceiver 120 and peripheral devices 130, 140, 150 communicate with each other via a piconet 135, 145, 155, which can also be referred do as a wireless communications path. In FIG. 1 piconet 135, 145, 155 is illustrated as wireless communication path 135 between transceiver 120 and first peripheral device 130, wireless communication path 145 between transceiver 120 and second peripheral device 140 and wireless communication path 155 between transceiver 120 and third peripheral device 150. The piconet can be a packet-based protocol as described in more detail below. A piconet can include a master device (transceiver 120) and one or more servant devices (peripheral devices 130, 140, 150). The master device coordinates communication throughout the piconet. The master device can send data to any of its slave devices and request data from them as well. Servant devices are only allowed to transmit to and receive from their master. The servant devices cannot talk to other servant devices in the piconet.

Peripheral devices 130, 140, 150 can be any suitable computer peripheral device, however the examples shown here are typically found in conventional gaming systems. For instance, peripheral device 130 may be a computer mouse, peripheral device 140 can be a keyboard, and peripheral device 150 can be an audio headset with or without a microphone. Each peripheral device 130, 140, 150 can be wirelessly coupled to host computer 110 using a communications protocol that manages the report rate of the peripheral devices as described in more detail below. One of ordinary skill in the art with the benefit of this disclosure would appreciate the many modifications, variations, and alternative embodiments thereof.

Figure 2:
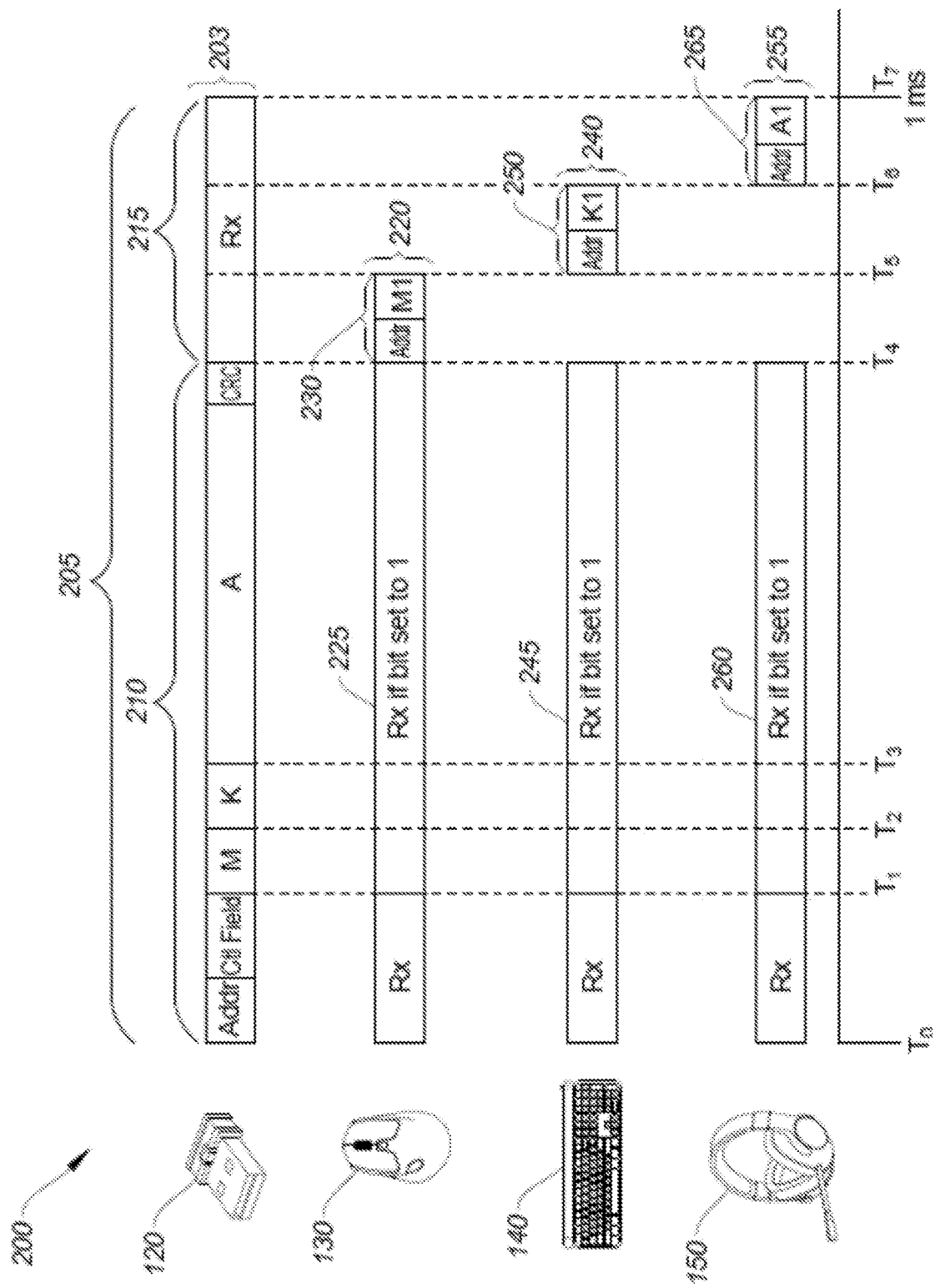
FIG. 2 shows a simplified sequence diagram depicting transmit/receive operations between the transceiver and the plurality of peripheral devices illustrated in FIG. 1, according to certain embodiments.

FIG. 2 illustrates a simplified sequence diagram 200 depicting transmit/receive operations between transceiver 120 and plurality of peripheral devices 130, 140, 150 that employ a communications protocol having a predetermined time for a communication cycle 205 (also called "report rate"), according to certain embodiments. As shown in FIG. 2, the time for communication cycle 205 for transceiver 120 and plurality of peripheral devices 130, 140, 150 is set to 1 millisecond, however other times for the communication cycle can be used, for example, between 0.75 and 1.25 milliseconds, between 0.5 and 2 milliseconds, between 0.25 and 5 milliseconds or in some embodiments less than 2 milliseconds. As described above, FIG. 2 is a simplified sequence diagram and one of skill in the art will appreciate that in other embodiments transmit and receive operations can be added to or removed from sequence diagram 200, without departing from the invention. In one example, sequence diagram 200 can include transceiver turnaround times and FC Fields as described in FIG. 7 of co-owned and co-pending U.S. patent application Ser. No. 16/369,992, which is incorporated by reference herein in its entirety for all purposes.

Within communication cycle 205, transceiver 120 employs a transceiver packet structure 203 that includes one transmit window 210 and one receive window 215 in which user data is communicated between the transceiver and plurality of peripheral devices 130, 140, 150. In some embodiments a single transmit window 210 and a single receive window 215 may be used so report rate can be maximized by reducing the number of times transceiver 120 must be reconfigured between transmitting and receiving functions. In some embodiments transceiver 120 may have addressing, control and overhead functions in addition to transmit and receive windows, 210, 215, respectively, that are used to communicate user data, as would be appreciated by one of skill in the art.

In this embodiment, each peripheral device 130, 140, 150 includes one receive period and one transmit period, respectively, in which user data is communicated with transceiver 120. More specifically, first peripheral device 130 may be a pointing device and has a first packet structure 220 that includes a first receive period 225 aligned within transmit window 210 of transceiver 120, and a first transmit period 230 aligned within receive window 215 of the transceiver. Similarly, second peripheral device 140 has a second packet structure 240 that includes a second receive period 245 aligned within transmit window 210 of transceiver 120, and a second transmit period 250 aligned within receive window 215 of the transceiver. Further, third peripheral device 150 has a third packet structure 255 that includes a third receive period 260 aligned within transmit window 210 of transceiver 120, and a third transmit period 265 aligned within receive window 215 of the transceiver. Each of first, second and third packet structures 220, 240, 255, respectively are described in more detail below.

In some embodiments the maximum time for communication cycle 205 (i.e., report rate) can be predetermined and therefore the number of peripheral devices that can fit into the transmit and receive windows may be fixed. As an illustrative example such a configuration may be beneficial for a competitive gaming enthusiast who wants to set a maximum report cycle time of 1 millisecond, which correlates to a report rate of 1000 times per second for each device coupled to the piconet. In this example, peripheral devices could be added to the piconet until there is no more time available in transmit and/or receive windows 210, 215, respectively, then the system could reject connection requests from new peripheral devices, drop a currently connected peripheral device or request the user to decrease the report rate so one or more new peripheral devices can be connected to the piconet, as described in more detail below.

Alternatively, the number and/or type of peripheral devices can be predetermined and the maximum time for communication cycle 205 (i.e., report rate) can be set based on the required transmit and receive time requirements for each peripheral device. As an illustrative example, this configuration may be beneficial for a trivia application that allows six users, each user having a mouse, to connect to the piconet where the piconet has a high report rate. In this example each mouse may have known transmit and receive times which can be used to predetermine the requisite times for transmit window 210, receive window 215 and communication cycle 205. If all six mice are connected to the piconet, when a user attempts to add a new additional peripheral device the system could reject additional connection requests, drop a currently connected peripheral device or request the user to decrease the report rate so one or more additional peripheral devices can be connected.

In both examples above, the report rate and the amount of time allotted for transmit and/or receive windows 210, 215, respectively can be predetermined. If there is room within transmit and receive windows 210, 215, respectively when a new peripheral device requests to be added to the piconet the request can accepted, however if there is not room then the system rejects additional connection requests, drops a currently connected device or decreases the report rate so the additional peripheral device can be connected. As appreciated by one of skill in the art, each peripheral device can have different transmit and receive time requirements that can be taken into consideration when setting the minimum report rate and/or the number and type of peripheral devices to be connected to the piconet.

By predetermining the time requirements for transmit and receive windows 210, 215, respectively as described above, transceiver 120 and peripheral devices 130, 140, 150 can be synchronized such that first, second and third transmit periods 230, 250, 265, respectively, do not interfere with each other. More specifically, because first, second and third peripheral devices 130, 140, 150 each transmit on the same piconet channel they cannot all simultaneously transmit so they must be arranged to transmit sequentially during transceiver receive window 215. Therefore, when a time for receive window 215 is predetermined a time slot within the receive window is assigned to each peripheral device to be connected to the piconet.

In this example embodiment, first peripheral device 130 is assigned first transmit period 230 starting at $T_4$ and ending at $T_5$, second peripheral device 140 is assigned second transmit period 250 starting at $T_5$ and ending at $T_6$ and third peripheral device 150 is assigned third transmit period 265 starting at $T_6$ and ending at $T_7$. In other embodiments, a similar process can be used to predetermine and assign time slots for first, second and third receive periods 225, 245, 260, respectively.

In some embodiments, if one or more of the first, second or third assigned transmit periods 230, 250, 265, respectively, are not filled by a connected peripheral device the transceiver can use the free slot to connect a new peripheral device or receive connection requests from a new peripheral device that is transmitting a connection request, as described in more detail below.

Sequence diagram 200 is for example only and one of skill in the art will appreciate that other data constructs could be used without departing from the scope of this disclosure. In this particular embodiment sequence diagram 200 includes both transmit and receive operations to communicate user data between the transceiver and the peripheral devices, and also includes typical overhead operations to address and configure the devices to communicate the user data. In some embodiments, transceiver packet structure 203 can include a transmit window 210 that includes an address field, a control field, operational data for peripheral device 130 (mouse M), operational data for peripheral device 140 (keyboard K), and operational data for peripheral device 150

(audio headset A). Transceiver packet structure 203 can also include a cyclic redundancy check (CRC), and a receive window 215 to receive data from each peripheral device 130, 140, 150. The address field can be a common address for each of the devices. Other communications overhead fields can be added as needed for transceiver 120 to transmit and receive data with peripheral devices 130, 140, 150.

Peripheral devices 130, 140, 150 may be configured to listen for transmitted data from transceiver 120 during their corresponding receive periods 225, 245, 260 within the predetermined time. The control field may contain for each peripheral device a sequence number for retries management (e.g., SNTx, SNRx) and/or a data (e.g., a bit) indicating if data is present for the device 1, device 2, or device 3 (M/K/A respectively). Note that the 3 bits used to indicate whether data is present in the packet structure can be used as LSB of the address in some implementations. After transmitting to peripheral devices 130-150 and the CRC, transceiver 120 switches from a transmit mode to a receive mode (a single turnaround) and listens for data from each peripheral device. Receive periods M, K, and A may be configured in any suitable order, and may be allocated longer or shorter time slots (e.g., but maintaining the overall predetermined time for communication cycle 205).

Packet structure 220 for peripheral device 130 includes first receive period 225 where it "listens" for a broadcast from transceiver 120, as described above. Peripheral device 130 may subsequently receive operational data (e.g., turning on/off LEDs on the mouse, changing a mode of operation— scroll wheel ratchet mode to smooth rotation mode, change tracking resolution of the mouse, etc.), for example, if the Rx bit is sent to 1 (control field indicated that operational data was present). After the CRC in packet structure 203 (from transceiver 120), the mouse can provide its unique address and mouse data (e.g., movement data, button presses, etc.) during a period of time. In some cases, the mouse may send data during a preset periods in a time-division multiplexed (TDM) manner where each peripheral device is afforded a particular period of time per packet structure to send data.

Packet structures 240 and 255 operate similar to packet structure 220 described above, in that both can have a receive periods 245, 260, respectively, during the same time as peripheral device 130 and each can receive data from transceiver 120 as a "global" address is provided that is configured to designate all peripheral devices in the network (or a subset thereof). Each peripheral device 130, 140, 150 can then receive their corresponding operational data (e.g., LEDs on the keyboard, audio data for the headset, etc.), and the each peripheral device can provide its unique address followed by their corresponding peripheral device data (e.g., keystrokes on the keyboard).

Alternatively or additionally, each peripheral device 130, 140, 150 may employ frequency hopping (in addition to TDM arrangements) when sending data back to transceiver 120. One of ordinary skill in the art with the benefit of this disclosure would appreciate the many modifications, variations, and alternative embodiments thereof, however some preferred embodiments keep the peripheral data within a particular time frame (e.g., receive window 215 in packet structure 203) to help achieve the predetermined time frame (in this case 1 millisecond).

Note that some embodiments may include addresses that are configured address multiple peripheral devices, but not all. For example, some embodiments may address the mouse and keyboard only, but on the headphones. Some packets may include an address that only instructs one of the three peripherals to listen for data. Furthermore, the operational data fields in packet structures 220, 240, 255 may be partitioned in a TDM-type arrangement, or may be configured to cause each peripheral device to shut down after receiving its corresponding data, or if no data is to be provided in that particular packet (as indicated by the control field of transceiver packet structure 203). One of ordinary skill in the art with the benefit of this disclosure would appreciate the many modifications, variations, and alternative embodiments thereof.

Figure 3:
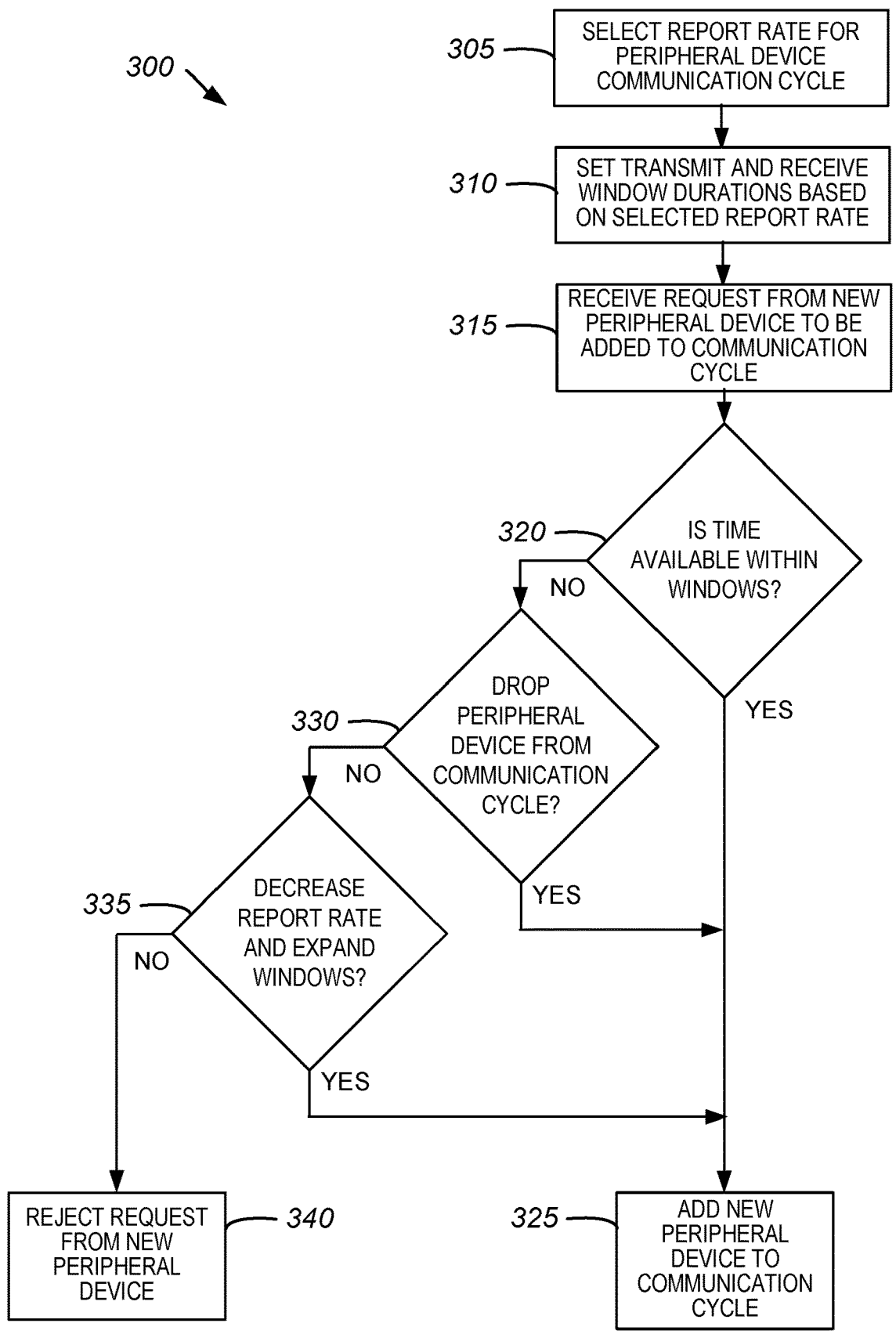
FIG. 3 illustrates a simplified flow diagram for a communication method used to transfer peripheral device data between a host device and one or more connected peripheral devices, according to certain embodiments.

FIG. 3 illustrates a simplified flow diagram for a communication method 300 used to transfer peripheral device data between a host device and one or more connected peripheral devices, according to certain embodiments. In step 305 a minimum report rate, or a maximum duration for a peripheral device communication cycle, such as communication cycle 205 in FIG. 2 is selected. In some embodiments a user interface allows a user to select, for example, 1 millisecond as the maximum communication cycle time, or in other embodiments a host algorithm can select the minimum report rate.

In step 310 transmit and receive window durations are set based on the report rate selected in step 305. As an example, a duration for transmit window 210 in FIG. 2 and a duration for receive window 215 can be set based on the report rate selected in step 305. The durations for transmit and receive windows, 210, 215, respectively can be used to limit how many peripheral devices are added to the piconet to maintain the selected report rate, as described in more detail below.

In step 315 a request from a new peripheral device to join the communication cycle is received by the host. In some embodiments the new peripheral device transmits a request via a piconet to a transceiver (such as transceiver 120 in FIG. 1) which can be processed by the host. In some embodiments the new peripheral device has been previously paired with the host, however in other embodiments it may be a new device that needs to go through a pairing process.

In step 320 the host determines if time is available within the transmit window (such as transmit window 210 in FIG. 2) and within receive window (such as receive window 215 in FIG. 2) to accommodate adding the new peripheral device to the communication cycle while maintaining the report rate selected in step 305. If time is available, method 300 proceeds to step 325 in which the new peripheral device is added to the communication cycle. However, if time is not available, then method 300 proceeds to step 330.

In step 330 the host determines if an existing peripheral device that is currently connected via the piconet should be dropped from the communication cycle to make room for adding the new peripheral device. In some embodiments the host may prompt the user to request permission to drop the connected peripheral device. In other embodiments the host may have a priority scheme and automatically drop a lower priority peripheral device for a higher priority peripheral device. One of skill in the art will appreciate that other decision criteria can be used by the host to determine whether or not to drop a currently connected peripheral. If a currently connected peripheral device is dropped freeing up adequate time within the transmit and receive windows, then method 300 proceeds to step 325 in which the new peripheral device is added to the communication cycle. However, if time is not available, then method 300 proceeds to step 335.

In step 335 the host determines if the report rate selected in step 305 should be decreased to expand the transmit and receive windows to accommodate adding the new peripheral device. In some embodiments a required transmit time and receive time for the new peripheral device are known by the host and the host determines the new report rate required to accommodate adding the new peripheral device. In various embodiments the host can prompt the user to accept the decreased report rate or the host can include a scheme to automatically determine whether the report rate should be decreased based on the device characteristics, connection history or other parameter. If the report rate is decreased to accommodate the new peripheral device method 300 proceeds to step 325 in which the new peripheral device is added to the communication cycle. However, if time is not available, then method 300 proceeds to step 340 which rejects the new peripheral device from being added to the communication cycle.

It will be appreciated that communication method 300 is illustrative and that variations and modifications are possible. Steps described as sequential may be executed in parallel, order of steps may be varied, and steps may be modified, combined, added or omitted. For example, instead of step 305 occurring before step 310, step 310 can occur before 305. More specifically, in some embodiments a user may select the number and type of peripheral devices to be added to the communication cycle and the report rate can be determined based on those selections.

Figure 4:
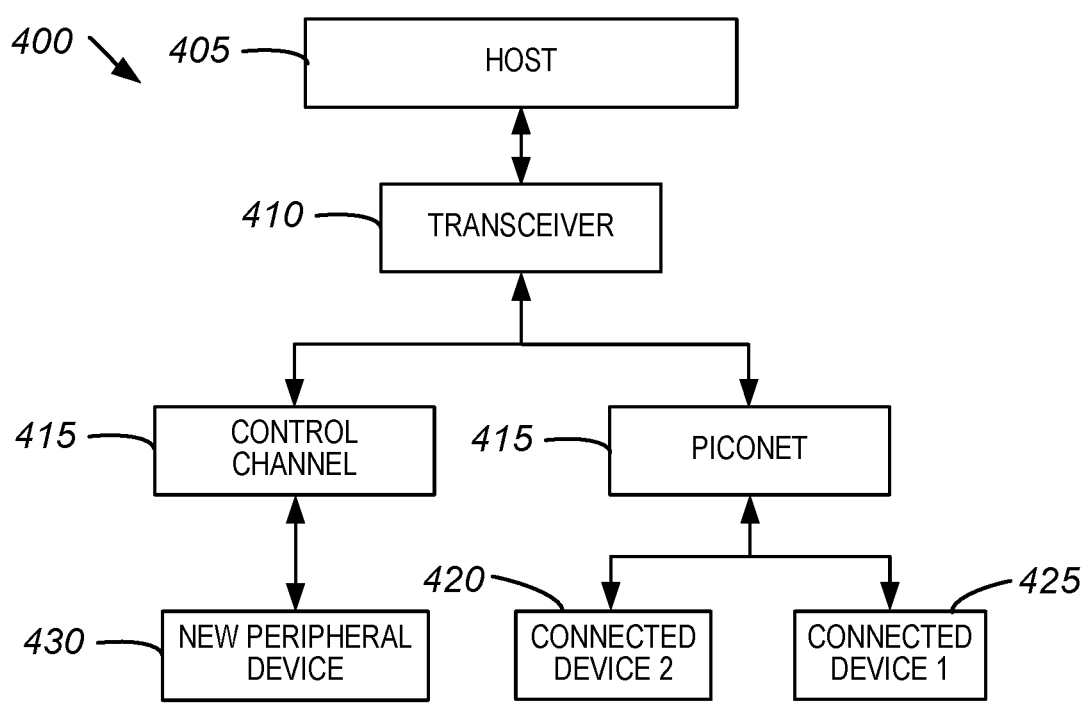
FIG. 4 illustrates a simplified systems diagram of a piconet based communication system for a host and a plurality of peripheral devices, according to certain embodiments.

FIG. 4 illustrates a simplified systems diagram 400 of a piconet based communication system for a host and a plurality of peripheral devices, according to certain embodiments. In some embodiments a host 405 (such as host 110 in FIG. 1) is coupled to a transceiver 410 (such as transceiver 120 in FIG. 1). The transceiver can be configured as a wireless transceiver to communicate via a piconet 415 (such as piconet 135, 145, 155 in FIG. 1) with a plurality of connected peripheral devices 420, 425 (such as peripheral devices 130, 140, 150 in FIG. 1). Connected peripheral devices 420, 425 can communicate with host via a communications protocol as described in FIG. 2.

Piconet 415 can operate on a distinct "data channel" that is used by transceiver 410 to communicate with connected devices 420, 425. A separate "control channel" can be used by transceiver 410 to communicate with new peripheral device 430 that is not connected to transceiver 410. As described herein, the data channel and the control channels are distinct communication channels that do not interfere with one another. One of skill in the art will appreciate that the channels do not need fixed carrier frequencies and each channel may employ frequency hopping and other communications protocols to establish bidirectional communications that can be used simultaneously without interfering with one another.

Therefore, new peripheral device 430 can transmit a pairing request at any time on control channel 415 without interfering with the data channel used for the piconet. In some embodiments host 405 may be configured to scan for new peripheral device 430 that is broadcasting a pairing request during one or more open periods within a communication cycle (such as communication cycle 205 in FIG. 2). For example, referring back to FIG. 2, in some embodiments only peripheral device 130 may be connected to piconet 415 and therefore host 405 can use time within second receive period 245, time within second transmit period 250, time within third receive period 260 and/or time within third transmit period 265 to configure the transceiver to the data and/or control channel and receive connection requests from new peripheral device 430. In further embodiments during any "dead time" within a communications cycle, host can receive pairing requests from new peripheral device 430.

Figure 5:
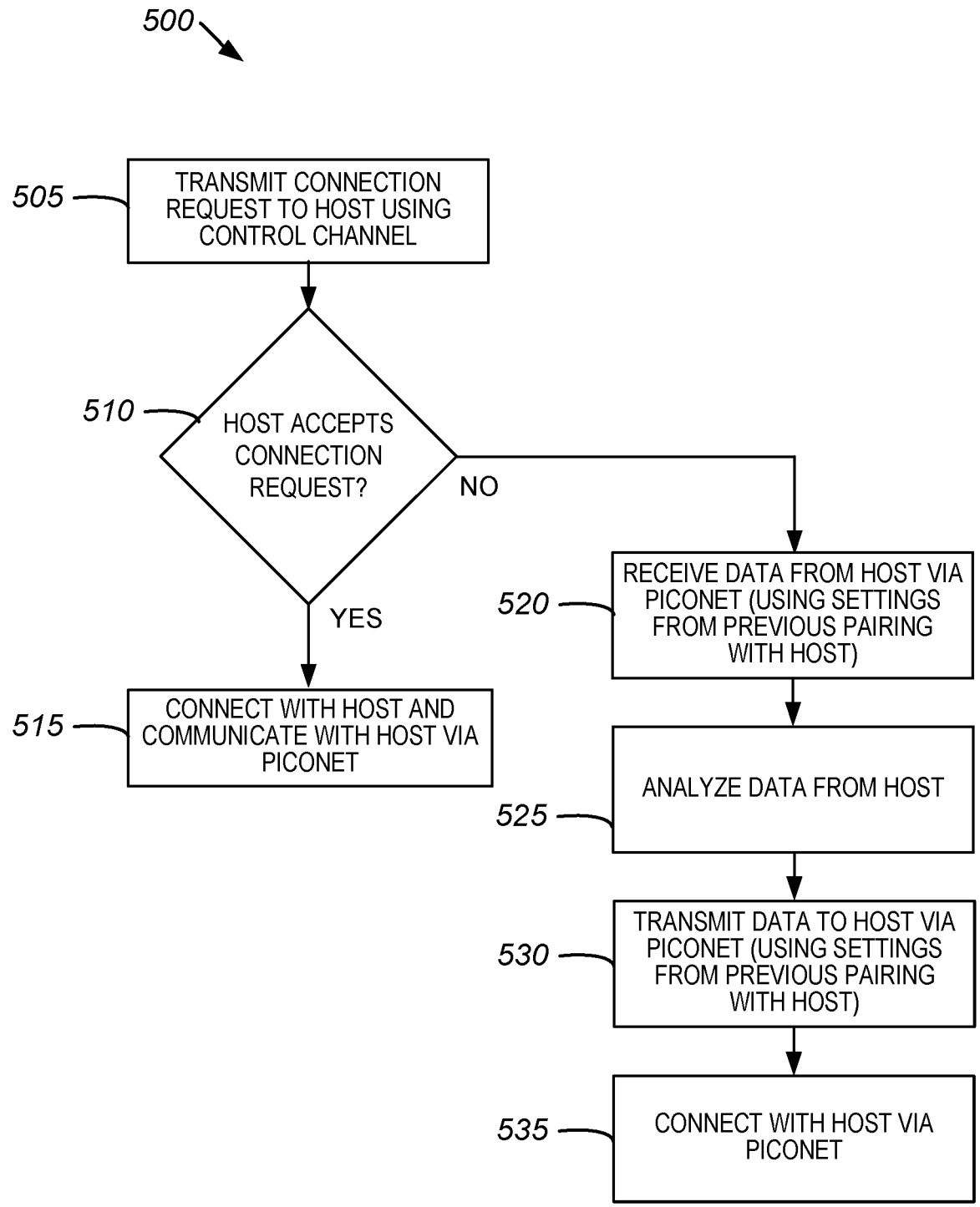
FIG. 5 illustrates a simplified flow diagram for a communication method used by a previously paired peripheral device to connect with a host via a piconet, according to certain embodiments.

FIG. 5 illustrates a simplified flow diagram for a communication method 500 used by a previously paired peripheral device to connect with a host via a piconet, according to certain embodiments. In step 505 a peripheral device (such as peripheral devices 130, 140, 150 in FIG. 1) transmits a connection request to a host (such as host 110 in FIG. 1) using a control channel. In some embodiments the control channel may be distinct and separate from a data channel that the piconet uses, as described in more detail herein.

In step 510 the host decides whether or not to accept the connection request sent in step 505. If the host accepts the connection request the method proceeds to step 515 in which the host connects with the peripheral device and adds the peripheral device to the piconet in which the host and the peripheral can communicate. However, if the host denies the request to connect or the host does not respond within the allotted time, then the connection request is deemed to be rejected and the method proceeds to step 520.

In step 520 the peripheral device enters a receive mode using data received from the host during a previous pairing process. More specifically, because the peripheral device was previously paired with the host and transceiver, the peripheral device has the address of the transceiver, the piconet information and any other required information necessary to receive data from the host. While the host is communicating with other peripheral devices the new peripheral device receives the data transmitted by the host. This scenario is illustrated in FIG. 6.

Figure 6:
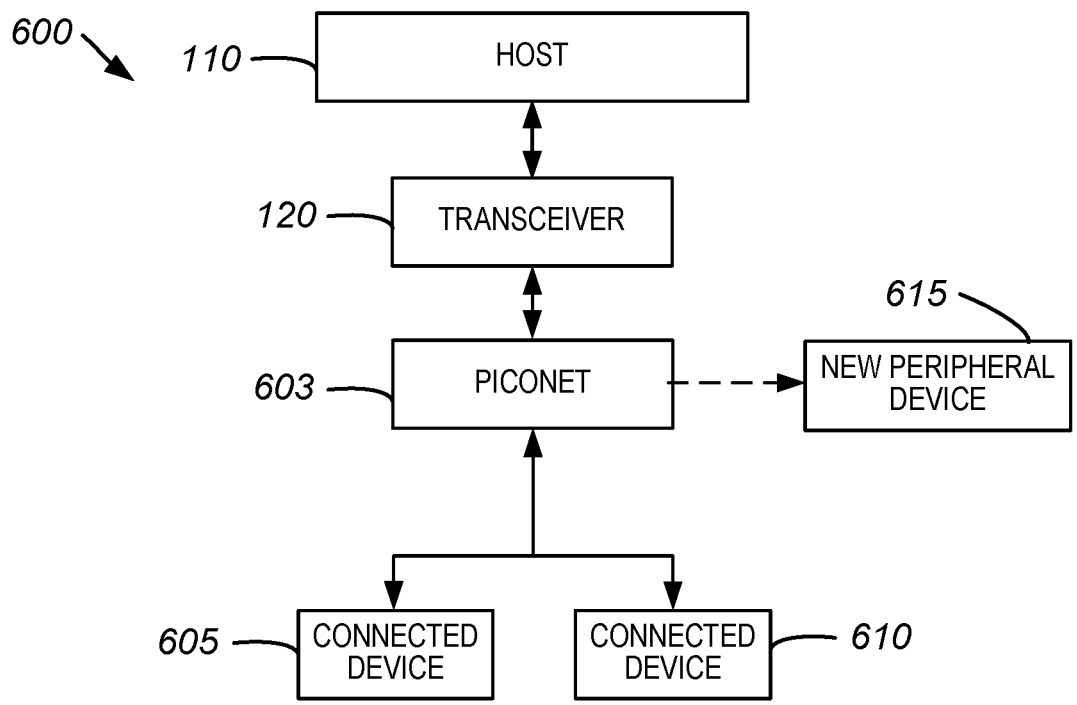
FIG. 6 illustrates a simplified systems diagram of a new peripheral device that receives piconet data transferred from a host to connected devices, according to certain embodiments.

FIG. 6 illustrates a simplified systems diagram of a new peripheral device that receives piconet data transferred from a host to connected devices, according to certain embodiments. As shown in FIG. 6, host 110 is coupled to transceiver 120. Transceiver transmits and receives data via piconet 603 with connected devices 605, 610. When transceiver 120 transmits data to connected devices 605, 610 via the piconet 603, new peripheral device receives that data using receiver settings from a previous pairing operation with host 110 and transceiver 120.

Now referring back to communication method 500 in FIG. 5, the method proceeds to step 525. In step 525 the new peripheral device analyzes the data received from the host to determine if there is an open transmit period within the communications cycle, such as, for example, third transmit period 265 in communications cycle 205 illustrated in FIG. 2. If a transmit period is open and if there is adequate time within the transmit period to allow new peripheral device to transmit data to host then the method proceeds to step 530.

In step 530 the peripheral device determines the appropriate time to start transmitting data to the host. In the example described above, the appropriate time to start transmitting would be at time $T_{10}$ as shown in FIG. 2 for the new peripheral device to fit into third transmit period 265. The new peripheral device is equipped with the necessary logic and processing capability to determine the appropriate time to transmit data to the host so it does not interfere with transmissions from other peripheral devices. In some embodiments the transmitted data from the new peripheral device may be user data while in other embodiments the data may identify the peripheral device and inform the host that it is requesting to be connected. As will be appreciated by one of skill in the art, any vacant transmit period within the communications cycle can be used by the new peripheral device. After transmitting data to the host the method proceeds to step 535.

Figure 7:
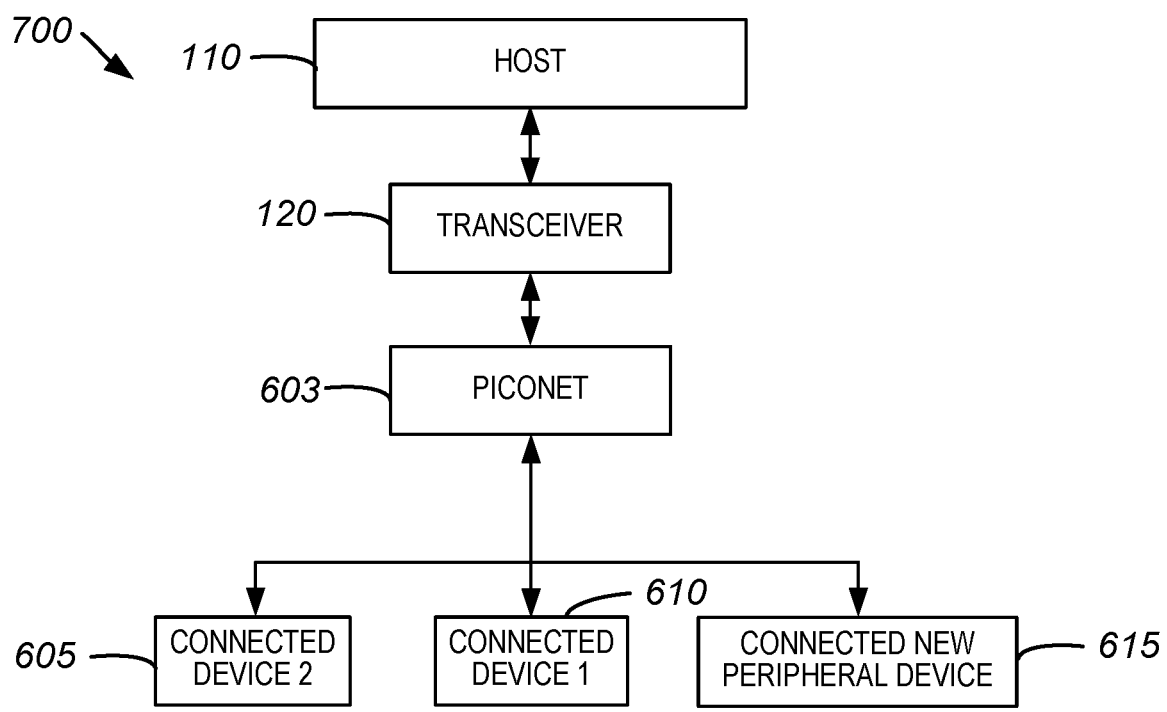
FIG. 7 illustrates a simplified systems diagram of the new peripheral device of FIG. 6 connected to host, according to certain embodiments.

In step 535 the peripheral device is connected to the host via the piconet. As described above, in some embodiments the new peripheral device may not perform further configuration data exchanges with host and may just enter the piconet using the prior configuration information from the pairing sequence. More specifically, the new peripheral device may just fit in to the appropriate transmission timing and therefore be considered connected to the host. However in other embodiments the first transmission from the peripheral device may include a request for connecting, then the host may exchange additional configuration information with the new peripheral device to connect it. As shown in FIG. 7, the new peripheral device 615 is now connected to host 110 via piconet 603. In some embodiments this connection process may obviate the need for the transceiver to change channels, such as to a control channel as described herein. This may result in more efficient operation of the transceiver because of reduced configuration time required by the transceiver to change channels.

It will be appreciated that communication method 500 is illustrative and that variations and modifications are possible. Steps described as sequential may be executed in parallel, order of steps may be varied, and steps may be modified, combined, added or omitted.

Figure 8:
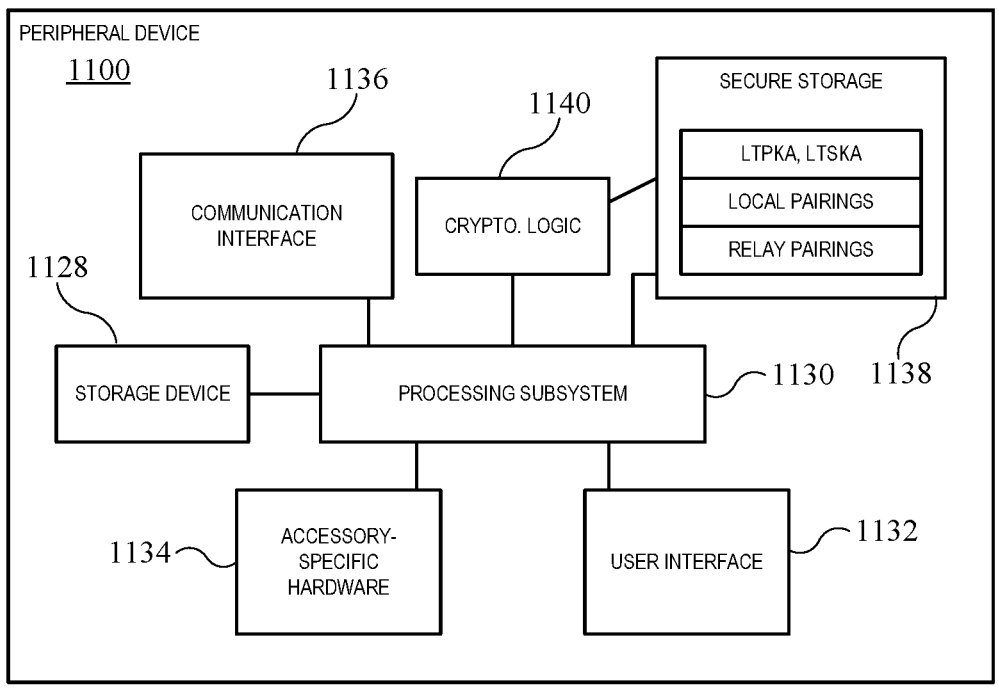
FIG. 8 shows a simplified block diagram of an example peripheral device, according to certain embodiments.

FIG. 8 shows a simplified block diagram of an example peripheral device 1100, according to certain embodiments. Peripheral device 1100 can implement any or all of the peripheral device functions, behaviors, and capabilities described herein, as well as other functions, behaviors, and capabilities not expressly described. Peripheral device 1100 can include storage device 1128, processing subsystem 1130, user interface 1132, peripheral device-specific hardware 1134, communication interface 1136, secure storage module 1138, and cryptographic logic module 1140. Peripheral device 1100 can also include other components (not explicitly shown) such as a battery, power media access devices, and other components operable to provide various enhanced capabilities.

Peripheral device 1100 is representative of a broad class of devices that can be used in conjunction with a host device such as but not limited to mice, keyboards, audio headsets, cameras, conferencing systems, printers and the like. Various accessories may include components not explicitly shown in FIG. 8, including but not limited to storage devices (disk, flash memory, etc.) with fixed or removable storage media; video screens, speakers, or ports for connecting to external audio/video devices; camera components such as lenses, image sensors, and controls for same (e.g., aperture, zoom, exposure time, frame rate, etc.); microphones for recording audio (either alone or in connection with video recording); and so on.

Storage device 1128 can be implemented, e.g., using disk, flash memory, or any other non-transitory storage medium, or a combination of media, and can include volatile and/or non-volatile media. In some embodiments, storage device 1128 can store one or more programs (e.g., firmware) to be executed by processing subsystem 1130, including programs to implement various operations described above as being performed by a peripheral device, as well as operations related to particular peripheral device behaviors. Storage device 1128 can also store a peripheral device object or peripheral device definition record that can be furnished to host devices, e.g., during device discovery. Storage device 1128 can also store peripheral device state information and any other data that may be used during operation of peripheral device 1100. Storage device 1128 can also store program code executable to communicate with a transceiver 120, as shown in FIG. 1, e.g., as described above.

Processing subsystem 1130 can include, e.g., one or more single-core or multi-core microprocessors and/or microcontrollers executing program code to perform various functions associated with peripheral device 1100. For example, processing subsystem 1130 can implement various processes (or portions thereof) described above as being implemented by a peripheral device, e.g., by executing program code stored in storage device 1128. Processing subsystem 1130 can also execute other programs to control other functions of peripheral device 1100. In some instances programs executed by processing subsystem 1130 can interact with a host (e.g., host 110 in FIG. 2), e.g., by generating messages to be sent to the host and/or receiving messages from the host. In some instances, the messages can be sent and/or received using a transceiver 120, as shown in FIG. 1, as described above.

User interface 1132 may include user-operable input devices such as a touch pad, touch screen, scroll wheel, click wheel, dial, button, switch, keypad, microphone, or the like, as well as output devices such as a video screen, indicator lights, speakers, headphone jacks, or the like, together with supporting electronics (e.g., digital-to-analog or analog-to-digital converters, signal processors, or the like). Depending on the implementation of a particular peripheral device 1100, a user can operate input devices of user interface 1132 to invoke functionality of peripheral device 1100 and can view and/or hear output from peripheral device 1100 via output devices of user interface 1132. Some accessories may provide a minimal or no user interface. Where the peripheral device does not have a user interface, a user can still interact with the peripheral device using a host (e.g., host 1200).

Peripheral device-specific hardware 1134 can include any other components that may be present in peripheral device 1100 to enable its functionality. For example, in various embodiments peripheral device-specific hardware 1134 can include one or more storage devices using fixed or removable storage media; GPS receiver; power supply and/or power management circuitry; a camera; a microphone; one or more actuators; control switches; environmental sensors (e.g., temperature sensor, pressure sensor, accelerometer, chemical sensor, etc.); and so on. It is to be understood that any type of peripheral device functionality can be supported by providing appropriate peripheral device-specific hardware 1134 and that peripheral device-specific hardware can include mechanical as well as electrical or electronic components.

Communication interface 1136 can provide voice and/or data communication capability for peripheral device 1100. In some embodiments communication interface 1136 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1136 can provide wired network connectivity (e.g., Ethernet) in addition to or instead of a wireless interface. Communication interface 1136 can be implemented using a combination of hardware (e.g., driver circuits, antennas, modulators/demodulators, encoders/decoders, and other analog and/or digital signal processing circuits) and software components. In some embodiments, communication interface 1136 can support multiple communication channels concurrently or at different times, using the same transport or different transports. Thus, for example, peripheral device 1100 can communicate with a host via a local channel at some times and via a relay service at other times.

Secure storage module 1138 can be an integrated circuit or the like that can securely store cryptographic information for peripheral device 1100. Examples of information that can be stored within secure storage module 1138 include the peripheral device's long-term public and secret keys 1142 (LTPKA, LTSKA), a list of local pairings 1144 (e.g., a lookup table that maps a local host identifier to a host long-term public key (LTPKC) for hosts that have completed a local pair setup or pair add process, e.g., as described above, with peripheral device 1100), and a list of relay pairings 1146 (e.g., host RAs and associated access tokens for hosts that have established a relay pairing, e.g., as described above, with peripheral device 1100). In some embodiments, pairing information can be stored such that a local pairing 1144 is mapped to the corresponding relay pairing 1146 in instances where both a local pairing and a relay pairing with the host have been established. In some embodiments, secure storage module 1138 can be omitted; keys and lists of paired hosts can be stored in storage device 1128.

In some embodiments, cryptographic operations can be implemented in a cryptographic logic module 1140 that communicates with secure storage module 1138. Physically, cryptographic logic module 1140 can be implemented in the same integrated circuit with secure storage module 1138 or a different integrated circuit (e.g., a processor in processing subsystem 1130) as desired. Cryptographic logic module 1140 can include various logic circuits (fixed or programmable as desired) that implement or support cryptographic operations of peripheral device 1100, including any or all cryptographic operations described above. Secure storage module 1138 and/or cryptographic logic module 1140 can appear as a "black box" to the rest of peripheral device 1100. Thus, for instance, communication interface 1136 can receive a message in encrypted form that it cannot decrypt and can simply deliver the message to processing subsystem 1130. Processing subsystem 1130 may also be unable to decrypt the message, but it can recognize the message as encrypted and deliver it to cryptographic logic module 1140. Cryptographic logic module 1140 can decrypt the message (e.g., using information extracted from secure storage module 1138) and determine what information to return to processing subsystem 1130. As a result, certain information can be available only within secure storage module 1138 and cryptographic logic module 1140. If secure storage module 1138 and cryptographic logic module 1140 are implemented on a single integrated circuit that executes code only from an internal secure repository, this can make extraction of the information extremely difficult, which can provide a high degree of security. Other implementations are also possible.

Peripheral device 1100 can be any electronic apparatus that interacts with host 1200. In some embodiments, host 1200 can provide remote control over operations of peripheral device 1100 as described below. For example host 1200 can provide a remote user interface for peripheral device 1100 that can include both input and output controls (e.g., a display screen to display current status information obtained from peripheral device 1100 and an input control such as a touchscreen overlay to allow changes to the status information). Host 1200 in various embodiments can control any function of peripheral device 1100 and can also receive data from peripheral device 1100, via a transceiver 120, as shown in FIG. 1.

Figure 9:
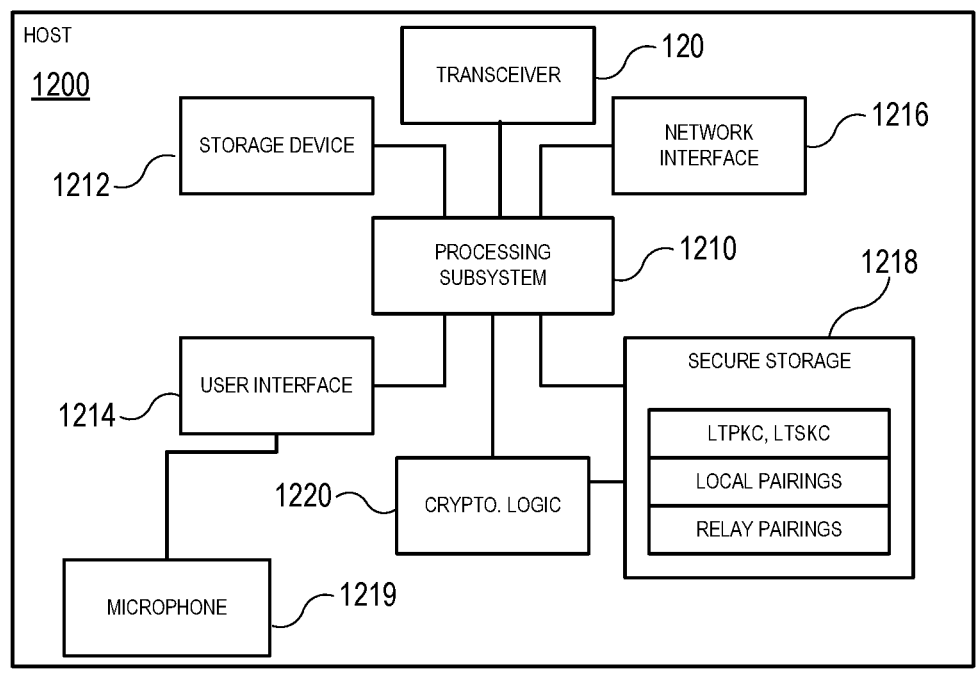
FIG. 9 shows a simplified block diagram of an example host, according to certain embodiments.

FIG. 9 shows a simplified block diagram of an example host 1200, according to certain embodiments. In some embodiments, host 1200 can implement any or all of the functions, behaviors, and capabilities described herein as being performed by a host, as well as other functions, behaviors, and capabilities not expressly described. Host 1200 can include processing subsystem 1210, storage device 1212, user interface 1214, communication interface 1216, secure storage module 1218, and cryptographic logic module 1220. Host 1200 can also include other components (not explicitly shown) such as a battery, power controllers, and other components operable to provide various enhanced capabilities. In various embodiments, host 1200 can be implemented in a desktop computer, laptop computer, tablet computer, smart phone, other mobile phone, wearable computing device, or other systems having any desired form factor. Further, as noted above, host 1200 can be implemented partly in a base station and partly in a mobile unit that communicates with the base station and provides a user interface.

Storage device 1212 can be implemented, e.g., using disk, flash memory, or any other non-transitory storage medium, or a combination of media, and can include volatile and/or non-volatile media. In some embodiments, storage device 1212 can store one or more application and/or operating system programs to be executed by processing subsystem 1210, including programs to implement various operations described above as being performed by a host. For example, storage device 1012 can store a uniform host application that can read a peripheral device description record and generate a graphical user interface for controlling the peripheral device based on information therein. Storage device 1212 can also store program code executable to communicate with a transceiver 120, as shown in FIG. 1, e.g., as described above. Although FIG. 9 illustrates transceiver 120 as a subsystem of host 1200 it is understood that transceiver 120 may be a dongle that is plugged into and electrically coupled with host 1200. In some embodiments, portions (or all) of the host functionality described herein can be implemented in operating system programs rather than applications. In some embodiments, storage device 1212 can also store apps designed for specific accessories or specific categories of accessories (e.g., an IP camera app to manage an IP camera peripheral device or a security app to interact with door lock accessories).

User interface 1214 can include input devices such as a touch pad, touch screen, scroll wheel, click wheel, dial, button, switch, keypad, microphone 1219, or the like, as well as output devices such as a video screen, indicator lights, speakers, headphone jacks, or the like, together with supporting electronics (e.g., digital-to-analog or analog-to-digital converters, signal processors, or the like). A user can operate input devices of user interface 1214 to invoke the functionality of host 1200 and can view and/or hear output from host 1200 via output devices of user interface 1214.

Processing subsystem 1210 can be implemented as one or more integrated circuits, e.g., one or more single-core or multi-core microprocessors or microcontrollers, examples of which are known in the art. In operation, processing system 1210 can control the operation of host 1200. In various embodiments, processing subsystem 1210 can execute a variety of programs in response to program code and can maintain multiple concurrently executing programs or processes. At any given time, some or all of the program code to be executed can be resident in processing subsystem 1210 and/or in storage media such as storage device 1212.

Through suitable programming, processing subsystem 1210 can provide various functionality for host 1200. For example, in some embodiments, processing subsystem 1210 can implement various processes (or portions thereof) described above as being implemented by a host. Processing subsystem 1210 can also execute other programs to control other functions of host 1200, including application programs that may be stored in storage device 1212. In some embodiments, these application programs may interact with a peripheral device, e.g., by generating messages to be sent to the peripheral device and/or receiving responses from the peripheral device. Such interactions can be facilitated by a peripheral device management daemon and/or other operating system processes, e.g., as described above, and can include communicating with the peripheral device via a transceiver 120, as shown in FIG. 1, as described above.

Communication interface 1216 can provide voice and/or data communication capability for host 1200. In some embodiments communication interface 1216 can include radio frequency (RF) transceiver components for accessing wireless voice and/or data networks (e.g., using cellular telephone technology, data network technology such as 3G, 4G/LTE, Wi-Fi, other IEEE 802.11 family standards, or other mobile communication technologies, or any combination thereof), components for short-range wireless communication (e.g., using Bluetooth and/or Bluetooth LE standards, NFC, etc.), and/or other components. In some embodiments communication interface 1216 can provide wired network connectivity (e.g., Ethernet) in addition to or instead of a wireless interface. Communication interface 1216 can be implemented using a combination of hardware (e.g., driver circuits, antennas, modulators/demodulators, encoders/decoders, and other analog and/or digital signal processing circuits) and software components. In some embodiments, communication interface 1216 can support multiple communication channels concurrently or at different times, using the same transport or different transports. Thus, for example, host 1200 can communicate with accessories via a local channel at some times and via a relay service at other times.

Secure storage module 1218 can be an integrated circuit or the like that can securely store cryptographic information for host 1200. Examples of information that can be stored within secure storage module 1218 include the host's long-term public and secret keys 1222 (LTPKC, LTSKC), a list of local pairings 1224 (e.g., a lookup table that maps a local peripheral device identifier to a peripheral device long-term public key (LTPKA) for accessories that have completed a local pair setup or pair add process, e.g., as described above, with host 1200), and a list of relay pairings 1226 (e.g., peripheral device RAs and associated access tokens for accessories that have established a relay pairing, e.g., as described above, with host 1200). In some embodiments, pairing information can be stored such that a local pairing 1224 is mapped to the corresponding relay pairing 1226 in instances where both a local pairing and a relay pairing with the peripheral device have been established.

In some embodiments, cryptographic operations can be implemented in a cryptographic logic module 1220 that communicates with secure storage module 1218. Physically, cryptographic logic module 1220 can be implemented in the same integrated circuit with secure storage module 1218 or a different integrated circuit (e.g., a processor in processing subsystem 1210) as desired. Cryptographic logic module 1220 can include various logic circuits (fixed or programmable as desired) that implement or support cryptographic operations of host 1200, including any or all cryptographic operations described above. Secure storage module 1218 and/or cryptographic logic module 1220 can appear as a "black box" to the rest of host 1200. Thus, for instance, communication interface 1216 can receive a message in encrypted form that it cannot decrypt and can simply deliver the message to processing subsystem 1210. Processing subsystem 1210 may also be unable to decrypt the message, but it can recognize the message as encrypted and deliver it to cryptographic logic module 1220. Cryptographic logic module 1220 can decrypt the message (e.g., using information extracted from secure storage module 1218) and determine what information to return to processing subsystem 1210. As a result, certain information can be available only within secure storage module 1218 and cryptographic logic module 1220. If secure storage module 1218 and cryptographic logic module 1220 are implemented on a single integrated circuit that executes code only from an internal secure repository, this can make extraction of the information extremely difficult, which can provide a high degree of security. Other implementations are also possible.

Further, while a host is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Hosts and accessories described herein can be implemented in electronic devices that can be of generally conventional design. Such devices can be adapted to communicate using a uniform peripheral device protocol that supports command-and-control operations by which a host (a first electronic device) can control operation of a peripheral device (a second electronic device). In some instances, a device can combine features or aspects of a host and a peripheral device, e.g., in the case of a proxy as described above.

It will be appreciated that the system configurations and components described herein are illustrative and that variations and modifications are possible. It is to be understood that an implementation of host 1200 can perform all operations described above as being performed by a media access device and that an implementation of peripheral device 1100 can perform any or all operations described above as being performed by a peripheral device. A proxy, bridge, tunnel, or coordinator can combine components of host 1200 and peripheral device 1100, using the same hardware or different hardware as desired. The media access device and/or peripheral device may have other capabilities not specifically described herein (e.g., mobile phone, global positioning system (GPS), broadband data communication, Internet connectivity, etc.). Depending on implementation, the devices can interoperate to provide any functionality supported by either (or both) devices or to provide functionality that is partly implemented in each device. In some embodiments, a particular peripheral device can have some functionality that is not accessible or invocable via a particular media access device but is accessible via another host or by interacting directly with the peripheral device.

Further, while the media access device and peripheral device are described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

Various features described herein, e.g., methods, apparatus, computer-readable media and the like, can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features described herein may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A transceiver configured to wirelessly transfer data between a host computing device and one or more connected peripheral devices using a communication data construct transmitted and received by the transceiver, the data construct comprising:
    a packet structure forming a communication protocol for transferring peripheral device data between the host device and the one or more connected peripheral devices, wherein the packet structure is arranged in a repetitive communication cycle that includes:
        a transmit time window within which the host transmits data to the one or more connected peripheral devices; and
        a receive time window within which the host receives data from the one or more connected peripheral devices, wherein a duration of the receive time window is set based on a predetermined report rate between the host and the one or more connected peripheral devices;
    a logic circuit within the host that adds a new peripheral device as a connected peripheral device when the new peripheral device transmits a request to the host to be added as a connected peripheral device and the receive time window has time available to add the new peripheral device.

2. The transceiver of claim 1 wherein the predetermined report rate is a number of times a communication cycle is performed each second, where the communication cycle includes: (1) a duration of the transmit time window, (2) a duration of the receive time window and (3) all overhead time for the transceiver to transmit to the one or more connected peripheral devices and to receive from the one or more connected peripheral devices.

3. The transceiver of claim 1 wherein the logic circuit selectively discontinues communicating with one of the one or more connected peripheral devices when the receive time window does not have time available to add the new peripheral device.

4. The transceiver of claim 3 wherein subsequent to discontinuing communicating with the one of the one or more connected peripheral devices the logic circuit adds the new peripheral device as a connected device.

5. The transceiver of claim 3 wherein the host prompts a user to accept discontinuing communicating with the one of the one or more connected peripheral devices before discontinuing communicating with the one of the one or more connected peripheral devices.

6. The transceiver of claim 1 wherein the logic circuit increases a duration of the receive time window when the receive time window does not have time available to add the new peripheral device, and subsequently adds the new peripheral device as a connected device.

7. The transceiver of claim 6 wherein the host prompts a user to accept a reduced report rate before the logic circuit increases the duration of the receive time window.

8. The transceiver of claim 1 wherein the logic circuit rejects adding the new peripheral device as a connected peripheral device when the new peripheral device transmits a request to the host to be added as a connected peripheral device and the receive time window does not have time available to add the new peripheral device.

9. A method for wirelessly transferring data between a host computing device and one or more connected peripheral devices, the method comprising:
    transferring the data with a data construct comprising a packet structure arranged in a repetitive communication cycle that includes:
        a transmit time window within which the host transmits data to the one or more connected peripheral devices;
        a receive time window within which the host receives data from the one or more connected peripheral devices, wherein a duration of the receive time window is set based on a predetermined communication report rate between the host computing device and the one or more connected peripheral devices; and
    adding a new peripheral device as a connected peripheral device when the new peripheral device transmits a request to the host to be added as a connected peripheral device and the receive time window has time available to add the new peripheral device.

10. The method of claim 9 wherein the predetermined communication report rate is a number of communication cycles completed each second with each communication cycle including: (1) a duration of the transmit time window, (2) a duration of the receive time window and (3) all overhead time for the host to transmit to the one or more connected peripheral devices and to receive from the one or more connected peripheral devices.

11. The method of claim 9 further comprising selectively discontinuing communications with one of the one or more connected peripheral devices when the new peripheral device transmits a request to the host to be added as a connected peripheral device and the receive time window does not have time available to add the new peripheral device.

12. The method of claim 11 wherein subsequent to discontinuing communications with the one of the one or more connected peripheral devices the new peripheral device is added as a connected device.

13. The method of claim 11 wherein the host prompts a user to accept discontinuing communications with the one of the one or more connected peripheral devices before discontinuing communications with the one of the one or more connected peripheral devices.

14. The method of claim 9 wherein a duration of the receive time window is increased when the new peripheral device transmits a request to the host to be added as a connected peripheral device and the receive time window does not have time available to add the new peripheral device.

15. The method of claim 14 wherein the host prompts a user to accept a reduced communication report rate before the duration of the receive time window is increased.

16. The method of claim 9 wherein the request of the new peripheral device to be added as a connected peripheral device is rejected when the new peripheral device transmits a request to the host to be added as a connected peripheral device and the receive time window does not have time available to add the new peripheral device.

17. A method for wirelessly transferring data between a transceiver of a host device and a peripheral device over a communications path, the method comprising:

wirelessly transmitting from the peripheral device to the transceiver of the host device, a request to connect with the host computing device;

configuring a receiver circuit in the peripheral device to receive data wirelessly transmitted from the transceiver of the host to a connected peripheral device when the request to connect with the host computing device is not accepted;

receiving data wirelessly transmitted from the transceiver of the host to the connected peripheral device using the receiver circuit in the peripheral device;

analyzing the data with a processor of the peripheral device and identifying an available transmit period that can be used to transmit data from the peripheral device to the transceiver of the host device; and transmitting peripheral device data to the transceiver of the host device during the available transmit period.

18. The method of claim 17 wherein the request to connect with the host computing device is transmitted on a control channel and the data transmitted to the transceiver of the host device is transmitted on a separate piconet channel.

19. The method of claim 18 wherein after the transmitting peripheral device data to the transceiver, the host device and the peripheral device are connected on the piconet channel.

20. The method of claim 17 further comprising using settings received from the host device during a previous pairing communications for the configuring the receiver circuit in the peripheral device.

* * * * *